United States Patent
Verstraeten

[11] Patent Number: 5,325,702
[45] Date of Patent: Jul. 5, 1994

[54] MACHINE AND METHOD FOR DETERMINING THE LOAD CAPACITY OF FOUNDATION PILES

[75] Inventor: Alexander J. Verstraeten, Knokke-Heist, Belgium

[73] Assignee: Funderingstechnieken Verstraeten B.V., NE Oostburg, Netherlands

[21] Appl. No.: 945,764

[22] Filed: Sep. 16, 1992

[51] Int. Cl.$^5$ .............................................. G01M 7/00
[52] U.S. Cl. .................................... 73/12.13; 73/12.09
[58] Field of Search ................. 73/12.01, 12.04, 12.06, 73/12.07, 12.09, 12.12, 12.13, 11.03

[56] References Cited

U.S. PATENT DOCUMENTS

| | | | |
|---|---|---|---|
| 2,740,286 | 4/1956 | De Vost et al. | 73/12.04 |
| 3,226,974 | 1/1966 | Bresk et al. | 73/12.07 X |
| 3,566,668 | 3/1971 | Browning et al. | 73/12.13 |
| 3,931,729 | 1/1976 | Frederick | 73/11.03 |
| 4,034,603 | 7/1977 | Leeb et al. | 73/12.09 X |
| 4,359,890 | 11/1982 | Coelus | 73/12.13 |
| 4,433,570 | 2/1984 | Brown et al. | 73/12.04 |
| 4,542,639 | 9/1985 | Cawley et al. | 73/12.09 |
| 5,247,835 | 9/1993 | Howell | 73/12.01 |

FOREIGN PATENT DOCUMENTS

| | | | |
|---|---|---|---|
| 752155 | 7/1980 | U.S.S.R. | 73/12.07 |
| 1490530 | 6/1989 | U.S.S.R. | 73/12.09 |

Primary Examiner—Richard E. Chilcot, Jr.
Assistant Examiner—Elizabeth L. Dougherty
Attorney, Agent, or Firm—Kenyon & Kenyon

[57] ABSTRACT

A machine to determine the load capacity of foundation piles, containing a guide derrick whose axis can be positioned in line with the foundation pile axis; a drop-weight suspended in said derrick to means which can raise this weight to various heights and hold it there; an anvil at the bottom of the derrick, which anvil can travel vertically in a bottom guide within the guide derrick; a pressure capsule between said anvil and the top of the foundation pile to be tested; a measuring device on the foundation pile, which operates in conjunction with a laser measuring device mounted at a distance; a computer connected to said pressure capsule on the one hand and to said measuring device on the other hand, and itself connected to a printer; and means which in combination with said drop-weight enable the impact of the drop-weight on the pile to be prolonged by absorbing said impact and transmitting it relatively slowly to the pile.

18 Claims, 4 Drawing Sheets

MACHINE AND METHOD FOR DETERMINING THE LOAD CAPACITY OF FOUNDATION PILES

The present invention concerns a machine and a method for determining the load capacity of foundation piles, both for driven piles and pre-drilled piles.

For such determination of the load capacity of foundation piles, the methods used until now have been static test loading on the one hand and dynamic test loading on the other hand.

In the static test loading previously known, in general a ballast is used, whose mass is up to twice as great as the intended load capacity of the pile concerned.

Such a ballast, which for instance can consist of steel plates, placed above the pile by means of a special construction, is brought towards the pile in steps by means of a jack, finally loading the pile up to twice its normal load capacity.

At each step, the degree of sinking of the pile is measured, and the resulting data are converted into a diagram known as a load/settlement diagram.

This method of test loading is rather expensive and very time consuming.

In the case of dynamic test loading, a certain weight is dropped onto the top of the pile from a certain height, and the load-carrying capacity of the pile is determined from the stress-wave theory. However, the impact of the falling weight on the pile is of very short duration, about 10 milliseconds in total, which has the disadvantage that the pile does not have sufficient time to move under the load of the falling weight.

Attempts have been made in the past to use an explosion to make the impact last longer, but it has only been possible to extend the duration to about 80 milliseconds. Also, this demands a great deal of preparation, and only one large sudden load is applied.

The purpose of the present invention is to make an improvement to the test loadings previously known, by developing a dynamic load test in which the results obtained closely approach those of a static test loading.

In this method according to the invention a pile whose load capacity is to be determined is given several blows, while at the same time ensuring that the duration of each blow lasts up to 400 milliseconds.

To reach this objective, the present invention consists of a machine essentially formed by a frame which rests on an undercarriage, for example a caterpillar track undercarriage, thus giving it great mobility, on which a guide derrick is hinge-mounted, in which there is a ballast or weight fitted with means to enable the impact of the weight on the pile to be prolonged.

In a first embodiment, for this purpose a number of springs are placed underneath the above-mentioned weight; when the weight falls, these prolong the impact by absorbing it and transmitting it relatively slowly to the pile whose load capacity is to be determined.

In another possible embodiment, a pneumatic spring is used, with a round drop-weight fitted around the circumference of sealing rings in a hollow tube closed at the bottom, such that when the weight falls the air or other medium present in the tube is compressed under the weight of the drop-weight, so that the impact of the blow from the falling of the weight is transmitted relatively slowly to the above-mentioned pile, in the same way as the springs above.

In yet another possible embodiment, still with the same result, namely prolonging the force of the impact, a hydraulic cylinder is used, connected to large fluid accumulators onto which the weight is dropped.

A system such as described above must have a fairly large mass, for example of the order of 25 ton, depending on what is to be tested and up to which load.

The above-mentioned weight should preferably be suspended in the guide derrick from a hydraulic cylinder with a relatively large stroke, for example of the order of 3.5 meter, while at the bottom of the derrick there is an anvil which the drop-weight comes up against. Said anvil is movably mounted in a guide at the bottom of the derrick, and rests freely on a pressure capsule on top of the pile.

This pressure capsule is connected by cables to a computer which, at each impact or each fall of the weight on the anvil, records the duration of the impact and the force curve.

At a suitable distance from the pile whose load capacity is to be measured, for example of the order of 6 to 15 meters, there is also a laser measuring device which works in conjunction with the measurement capsule attached to the pile, such that the vertical displacement under the influence of the impact of the above-mentioned weight can be measured with an accuracy of up to 0.1 mm.

Both the measuring instrument and the measurement capsule are connected to the above-mentioned computer in such a way that at each impact, said computer can successively record the initial position of the pile, the displacement of the pile under the influence of the impact, and the position of the pile after the load has been removed.

According to the present invention, four blows should preferably be applied to the above-mentioned pile to be tested, with load steps of respectively 50%, 100%, 150% and 200% of the intended load capacity of the pile.

In a preferred embodiment, there are seven springs underneath the above-mentioned drop-weight, namely one central spring and six springs positioned around it, whereby said springs are in fact double, with an inner spring and an outer spring concentric with it, whereby said inner springs are a particular number of centimeters longer than the outer springs mounted around them, for example a dozen or so centimeters, and whereby the difference in height between each of the longer springs, i.e. The inner springs, is three centimeters, so that the impact of the weight on the anvil is as gradual as possible.

By varying the height from which the weight falls, the force exerted on the pile can of course also be varied.

In the embodiment with springs, the force exerted on the anvil, on the pile respectively is taken up gradually since the springs only begin to operate on the anvil one by one, finally reaching a maximum at which all springs are fully compressed, after which said springs push the drop-weight back upwards, whereby the difference between the starting height and the height to which it is pushed back up represents the energy transmitted to the test pile.

According to the present invention, there is an arrangement by means of which, as soon as the speed of the drop-weight reaches zero in the upward direction, the valves of the hydraulic cylinder from which the weight is suspended close, so that the weight is retained and cannot fall again.

Once the first impact has been carried out, the drop-weight is raised to a higher level, so that the following impact is carried out with a higher load.

The advantage of this test method is that the test cannot be manipulated, because all the data are automatically recorded in a computer, so that after the required number of impacts have been carried out, the corresponding load/settlement diagram is printed out, from which the load capacity and failure safety margin can be deduced.

In this manner, around ten tests can be carried out in a single day, which represents a large economic saving.

A machine constructed in this way consists essentially of a guide derrick whose axis can be positioned in line with the foundation pile axis; a drop-weight suspended in said derrick by means which can raise this weight to various heights and hold it there; an anvil at the bottom of the derrick, which can travel vertically in a bottom guide within the guide derrick; a pressure capsule between said anvil and the top of the foundation pile to be tested; a measuring device on the foundation pile, which operates in conjunction with a laser measuring device mounted at a distance; a computer connected to said pressure capsule on the one hand and to said measuring device on the other hand, and itself connected to a printer; and means which in combination with said drop-weight enable the impact of the drop-weight on the pile to be prolonged by absorbing said impact and transmitting it relatively slowly to the pile.

The method applied here consists essentially in exerting several successive blows with prolonged impact on a foundation pile via a pressure capsule mounted between the top of the foundation pile and an anvil, using a drop-weight which has means to enable its impact on the foundation pile to be prolonged by absorbing said impact and transmitting it to the foundation pile relatively slowly; recording each impact on the foundation pile and displaying said recording by means of a computer; measuring the settlement of the foundation pile under the effect of each blow, by means of a measuring device; and using a printer to print out the load/settlement diagram calculated by the computer.

In order to better explain the characteristics of the invention, a preferred embodiment of a machine is described below, without being limitative in any way, with reference to the accompanying drawings, where:

Figure 1:
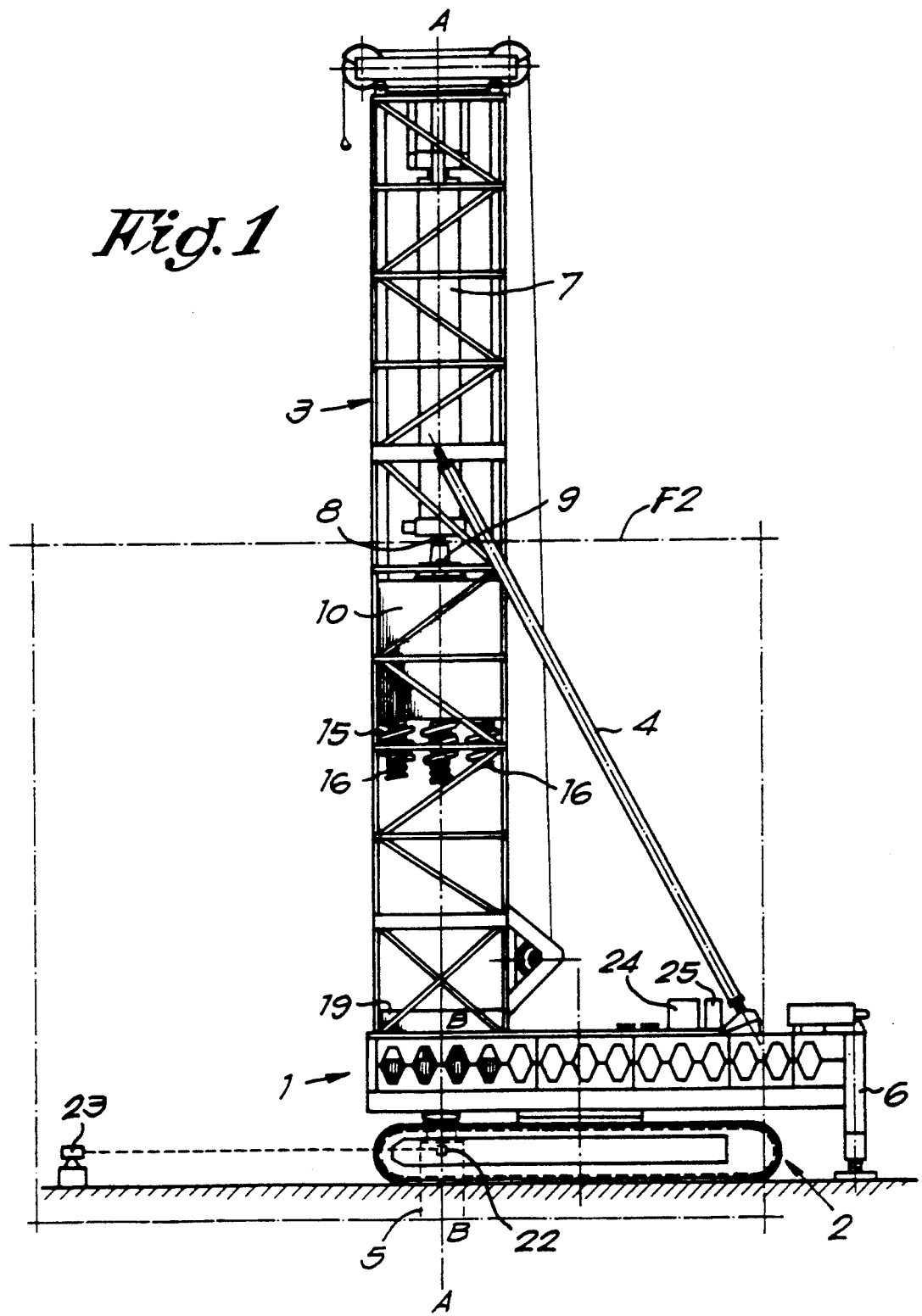
FIG. 1 is a side view of a machine according to the invention.

The machine according to the invention consists essentially of a general framework 1 resting on a mobile undercarriage 2 formed in this case by a caterpillar track undercarriage for the purpose of giving the machine great mobility.

On the framework 1 is mounted a derrick 3, preferably with a lattice structure, whereby said derrick is hinge-mounted on the framework 1 in a suitable way, in order for the derrick to be placed in a low, for example horizontal position for transport of the machine by road.

The derrick 3 is connected to the framework 1 by means of one or more hydraulic cylinders 4 in order for it to be brought into a suitable position with respect to the ground or to a foundation pile 5 respectively.

In practice, the derrick 3 will always be positioned so that its axis A—A coincides with the axis B—B of a foundation pile 5 to be tested.

The framework 1 should in addition preferably have several supports 6 to obtain a correct height adjustment and to support the machine on the ground whenever the machine is in use.

In the upper part of the derrick, a hydraulic cylinder 7 is mounted, whereby said hydraulic cylinder has very large exit ports in order to permit very high oil flow speeds.

Figure 2:
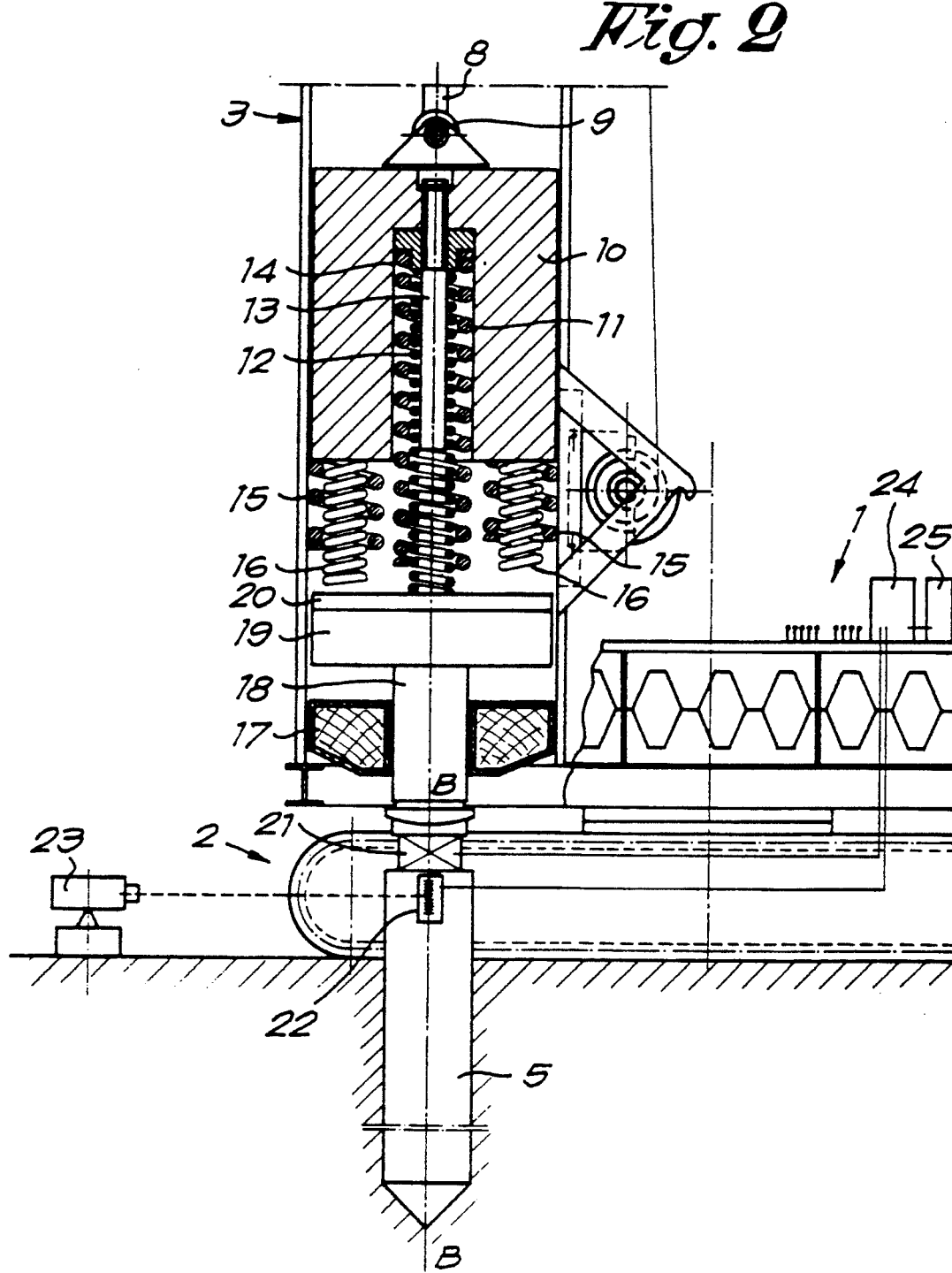
FIG. 2 shows, in partial cross-section and to a greater scale, a detail of the lower part of the machine according to FIG. 1, more particularly according to F2 in FIG. 1, showing the weight at the bottom of the guide derrick.

Attached to this cylinder 7 by means of a pivot 9, more particularly to the piston rod 8 of said cylinder, is a drop-weight 10, which in the embodiment shown in FIGS. 1 and 2 is fitted with a series of springs, namely in this case a central spring 11 with a spring 12 of smaller diameter mounted concentrically inside it, whereby said smaller spring 12 slides over a mandril 13 which together with the springs 11 and 12 is mounted in a recess 14 in the drop-weight 10, and around the centrally-located springs 11–12 further pairs of springs 15–16 whose top ends are attached to the underneath of the drop-weight 10 in a suitable way, not shown in the drawings, whereby the inner springs 16 of these pairs 15–16 can also be guided over a mandril. The outer spring 11 or 15 of the pairs of springs 11–12 and 15–16 is shorter, for example 10 to 15 cm, than the inner spring 12 or 16.

The springs 11–12, 15–16 respectively, have different lengths as will become clear hereafter.

The derrick 3 is provided at the bottom with a guide 17 mounted therein in which a vertical part 18 of an anvil 19 has been applied such that it can travel vertically. On this anvil 19 is preferably applied a rubber mat 20.

Said middlemost pair of springs 11–12 protrudes more from the bottom side of the drop-weight 10 when in rest position than the other pair of springs 15–16. These springs 15–16 also have, for example per pair of opposed springs, different lengths with respect to said bottom. The difference in length between the pairs is for example of the order of 3 cm. Due to this difference in length the springs 10–11 and 15–16 successively make contact with the anvil 19 as the drop-weight 10 falls, such that the impact is as gradual as possible.

Further, these springs 11–12 and 15–16 protrude so much from under the drop-weight 10 that when this drop-weight 10 falls from its topmost position, it can never touch the anvil 19.

In combination with the thus formed machine also a pressure capsule 21 is used which is placed on top of the foundation pile 5 to be tested; a measuring device 22 which is mounted for example on a side of the foundation pile; a laser measuring device 23 erected at a certain distance from the foundation pile 5 opposite the measuring device 22; and a computer 24 with printer 25 which is correctly connected to the pressure capsule 21 on the one hand and to said measuring device 22 on the other hand.

The working of a machine according to the invention is very simple and as following.

In order to test the load capacity of a foundation pile the derrick 3 will first of all be placed with its central axis A—A in the extension of the central axis B—B of the pile concerned by means of the hydraulic cylinders 4, after which the drop-weight 10 is put into a first position by means of a cylinder 7, for example at such a height that, when the drop-weight 10 is released and falls onto the pile 5, the impact exerted on the pile amounts to about 50% of the intended load capacity of the pile.

Subsequently, the cylinder 7 is commanded in a suitable manner such that the drop-weight 10 falls down freely.

As the pairs of springs 11-12 and 15-16 fall onto the anvil 19 one after the other, these springs, due to the weight of the mass 10, will be compressed until the downward speed of the mass or weight 10 is equal to nil.

Subsequently the springs 11-12 and 15-16 push the weight 10 back upwards to a height which is of course lower than the original height of the weight 10 whereby, as soon as the upward speed of the weight 10 is equal to nil, the valves of the hydraulic cylinder 7 automatically close so as to hold the weight in this position.

Figure 5:
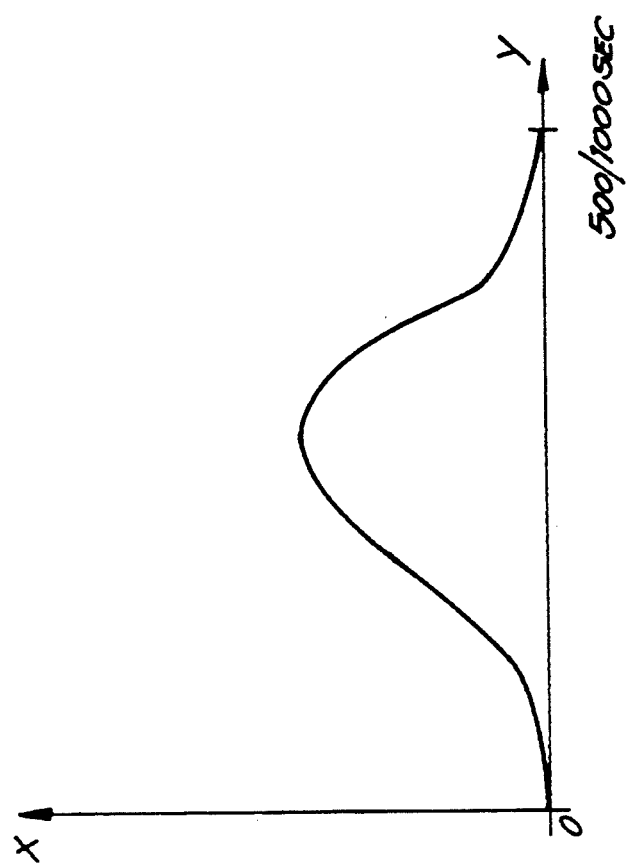
FIG. 5 shows the force variation in the foundation pile as a result of a blow carried out with a device according to the invention.

As the weight falls onto the anvil 19, the springs aim to prolong the duration of the impact exerted by the weight 10 on the anvil 19 and to reduce the peak stress as is shown in FIG. 5.

As the weight 10 falls onto the anvil 19 which rests on the pressure capsule 21 placed on top of the pile 5, the force in the pressure capsule 21 is measured on the one hand, and the displacement of the pile 5 on the other hand.

The thus registered data are transmitted to the computer 24 to be processed.

It should be noted that the measurements of the laser measuring equipment, the measuring equipment 21 respectively, is accurate to 0.1 mm, whereby for each blow the initial position is measured, the displacement under the load, in particular the impact of the blow exerted by the weight 10 on the pile 5 and the position of the pile 5 after the load, in other words the permanent displacement of the pile 5 with respect to the initial position.

Then the weight should be raised to a higher level, for example a height from which the weight can exert an impact corresponding to 100% of the intended load capacity of the pile, after which the above-mentioned procedure is repeated.

Then the method should be preferably repeated with an intended load of 150% and finally 200% of the load capacity of the pile.

The data which are thus registered by the computer will be processed by the latter so as to obtain a load/settlement diagram on the basis of which the load capacity and thus the safety factor and the failure safety margin of the pile concerned can be deduced.

It is clear that, although in the method described above four blows are exerted on the pile 5, the number of blows can be increased at random so as to obtain a diagram which is more precise.

Figure 3:
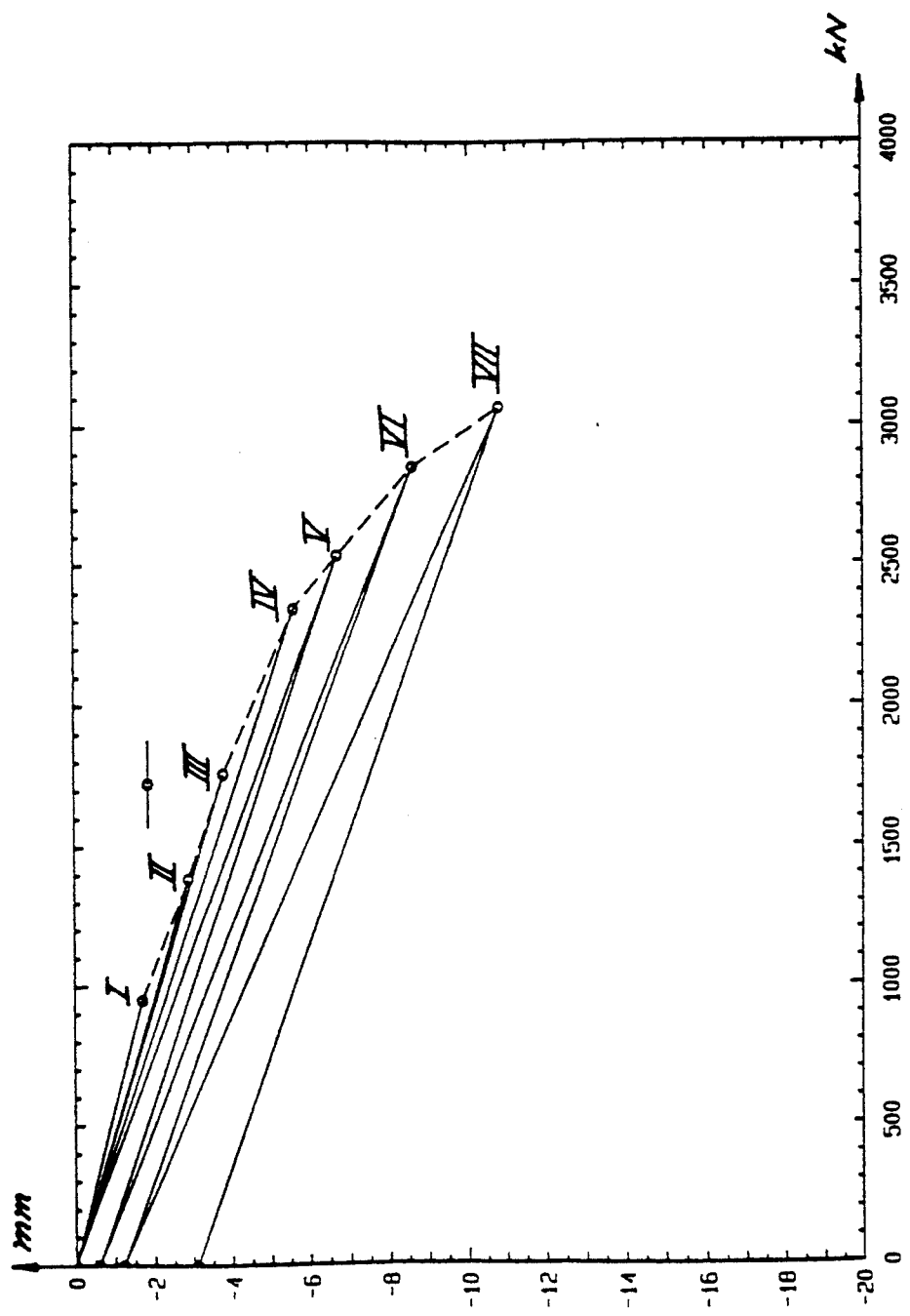
FIG. 3 is a load/settlement diagram of a foundation pile whose load capacity is to be determined.

FIG. 3 shows a load/settlement diagram whereby seven blows I to VII are exerted on the pile concerned, whereby the abscissa of this diagram represents the exerted force in for example kN and the axis of ordination represents the displacement of the pile in mm.

Figure 4:
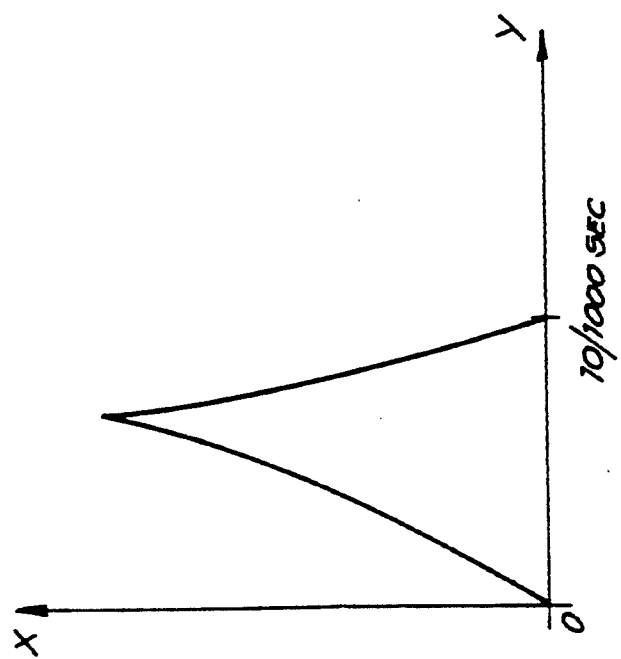
FIG. 4 shows the force variation in the pile under the effect of a blow from a pile driver as used for a known dynamic test loading.

Finally, FIGS. 4 and 5 show the difference of the force variation in a foundation pile as a result of a direct blow of a piling hammer on the pile (FIG. 4) and the force variation in a foundation pile as a result of a blow exerted by means of the machine according to the invention (FIG. 5), whereby the abscissa represents the time and the axis of ordination the exerted force.

The rubber mat 20 finally has a double function, namely to reduce the sound level during the testing on the one hand and to weaken the peak stress as the springs touch the anvil 19 on the other hand.

In this way a machine is obtained as well as a method for testing foundation piles whereby, through the use of a buffer such as for example a pneumatic spring, a mechanical spring construction in the drop-weight or such like, the impact of the drop-weight on the pile whose load capacity should be tested is prolonged and whereby also the force in the pile and the displacement of the pile is measured and registered.

The present invention is in no way limited to the embodiment described above and shown in the accompanying drawings.

I claim:

1. A machine to determine the load capacity of foundation piles, comprising a guide derrick having an axis for positioning in line with a foundation pile axis; a drop-weight suspended in said derrick by means for raising said drop-weight to various heights and holding it there; an anvil at the bottom of the derrick, said anvil disposed in a bottom guide within the guide derrick for vertical travel; a pressure capsule between said anvil and the top of the foundation pile to be tested; a measuring device on the foundation pile, which operates in conjunction with a laser measuring device mounted at a distance; a computer connected to said pressure capsule, to said measuring device, and to a printer; and means which in combination with said drop-weight enable the impact of the drop-weight on the pile to be prolonged by absorbing impact energy an transmitting said absorbed energy to the pile, said means comprising pairs of spring means having different non-compressed lengths.

2. The machine according to claim 1, wherein the guide derrick is hinge-mounted on a framework resting on a mobile undercarriage, whereby the guide derrick is connected to the framework by means of at least one hydraulic cylinder for bringing the guide derrick into a specific position with respect to a pile and for holding it there, and whereby the framework is provided with supporting means.

3. The machine according to claim 1, wherein the means to which the drop-weight is suspended consist of a hydraulic cylinder having a piston and a piston-rod.

4. The machine according to claim 3, wherein the cylinder is provided with large exit ports.

5. The machine according to claim 1, wherein the guide derrick has a guide at the bottom in which a vertical part of the anvil has been mounted for travel.

6. The machine according to claim 1, wherein the anvil is equipped with a rubber mat.

7. The machine according to claim 3, wherein the drop-weight has been hinge-mounted to the piston rod of the hydraulic cylinder by means of a pivot.

8. The machine according to claim 1, wherein said pairs of spring means comprise springs which are attached under the drop-weight.

9. The machine according to claim 8, wherein the springs comprise pairs of springs which are concentrically mounted.

10. The machine according to claim 9, wherein a guide mandril is provided in one said pair of springs.

11. The machine according to claim 9, wherein an outer spring of each pair of springs, when released, is shorter than a corresponding inner spring.

12. The machine according to claim 11, wherein the length of the inner springs is 10 to 15 cm longer than the length of the corresponding outer springs.

13. The machine according to claim 9, wherein different pairs of springs have different lengths with respect to the bottom side of the drop-weight.

14. The machine according to claim 9, wherein one of the pairs of springs is placed in line with an axis of the drop-weight, whereas the remaining pairs of spring are attached to the bottom of the drop-weight and are placed in a circle having the axis of the drop-weight as its centre.

15. The machine according to claim 1, wherein the means to prolong the impact of the drop-weight on the pile by absorbing said impact and transmitting it to the pile further comprises a round drop-weight provided at its circumference with sealing rings and provided in a hollow tube closed at the bottom.

16. A method for determining the load capacity of foundation piles which method comprises exerting several successive blows with prolonged impact on a foundation pile via a pressure capsule mounted between the top of the foundation pile and an anvil, using a drop-weight which has means attached to the bottom of the drop-weight to enable its impact on the foundation pile to be prolonged by absorbing said impact and slowly transmitting it to the foundation pile, said means comprising pairs of spring means having different non-compressed lengths; recording each impact on the foundation pile and displaying said recording by means of a computer; measuring the settlement of the foundation pile under the effect of each blow by means of a measuring device and in using a printer to print out a load/settlement diagram calculated by the computer.

17. The method according to claim 16, wherein the blows exerted on the foundation pile are successively exerted with a greater load.

18. The method according to claim 17, wherein in the case of four blows the first blow represents a load of 50% of the intended load capacity on the foundation pile, and the subsequent blows represent a load of respectively 100%, 150% and 200% of said intended load capacity.

* * * * *